Sept. 11, 1962 W. V. SPURLIN 3,053,380
DUAL ECCENTRIC WEIGHT VIBRATORY GENERATOR FOR CIRCULAR FEEDER
Filed Feb. 15, 1960 4 Sheets-Sheet 1
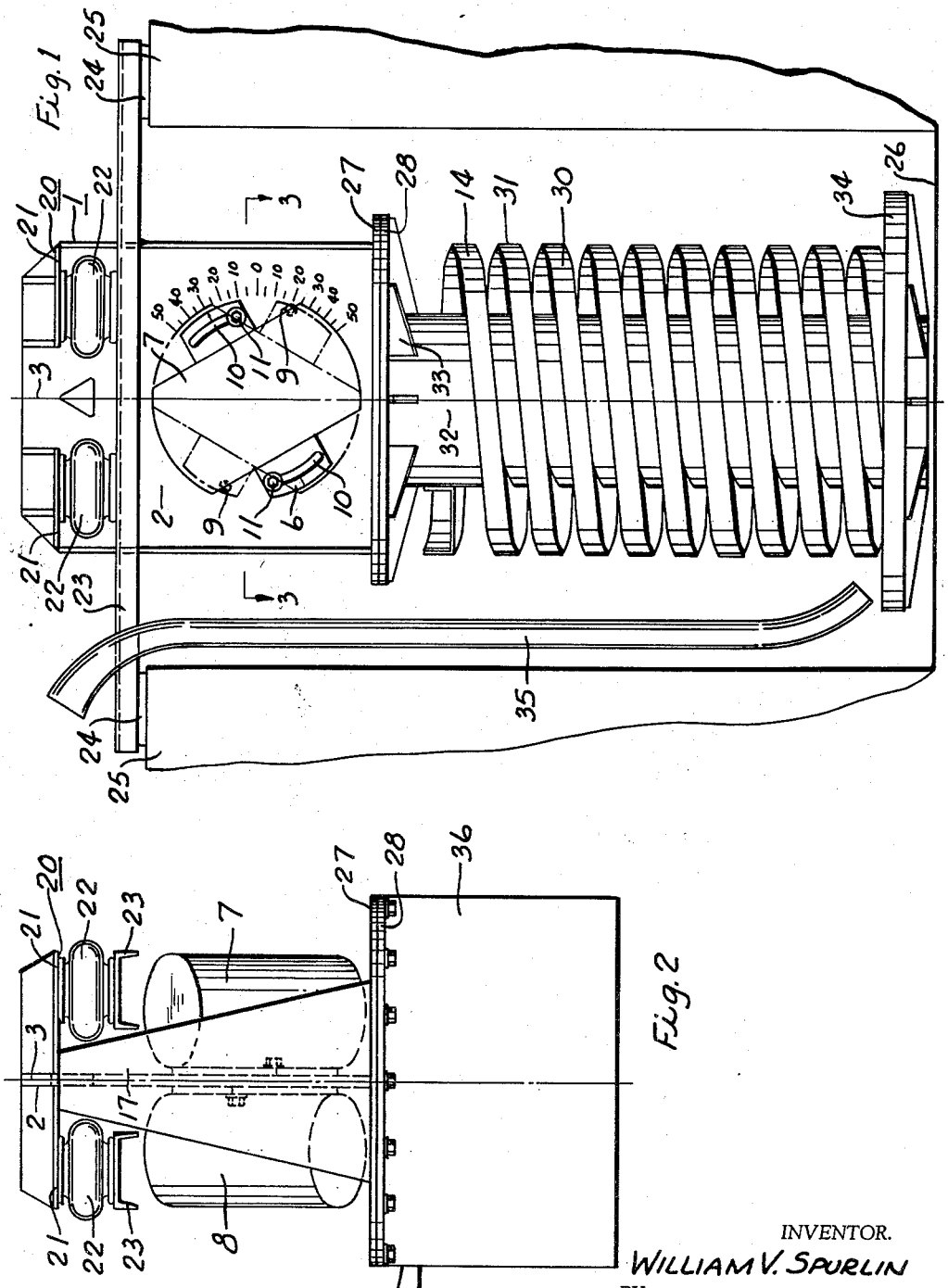
INVENTOR.
WILLIAM V. SPURLIN
BY
HIS ATTORNEY Sept. 11, 1962 W. V. SPURLIN 3,053,380
DUAL ECCENTRIC WEIGHT VIBRATORY GENERATOR FOR CIRCULAR FEEDER
Filed Feb. 15, 1960 4 Sheets-Sheet 2
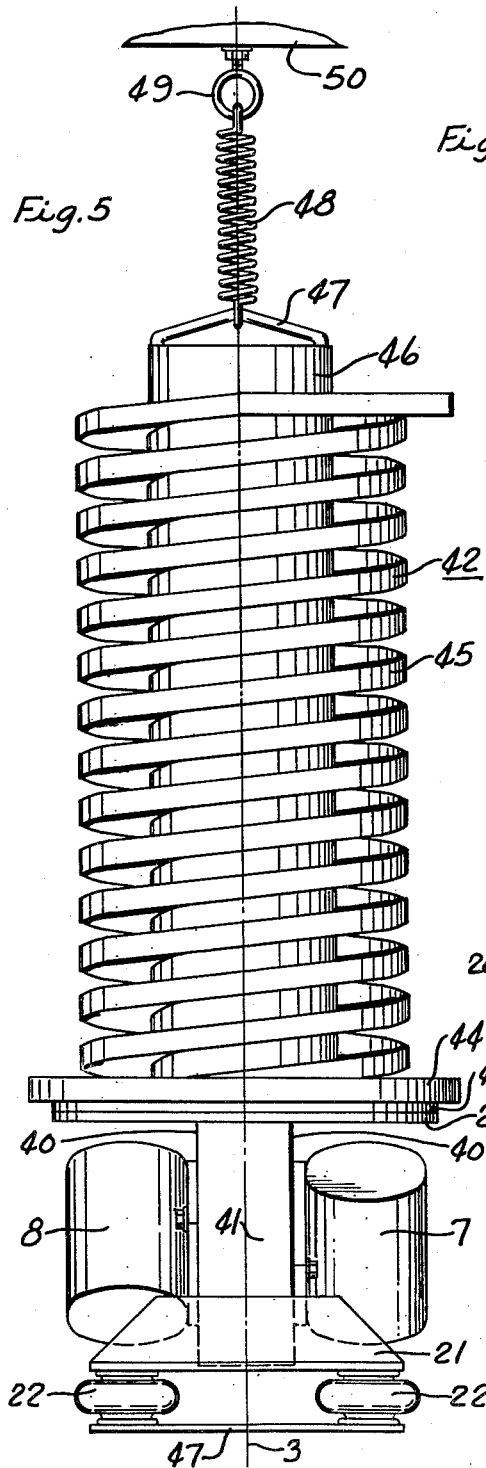
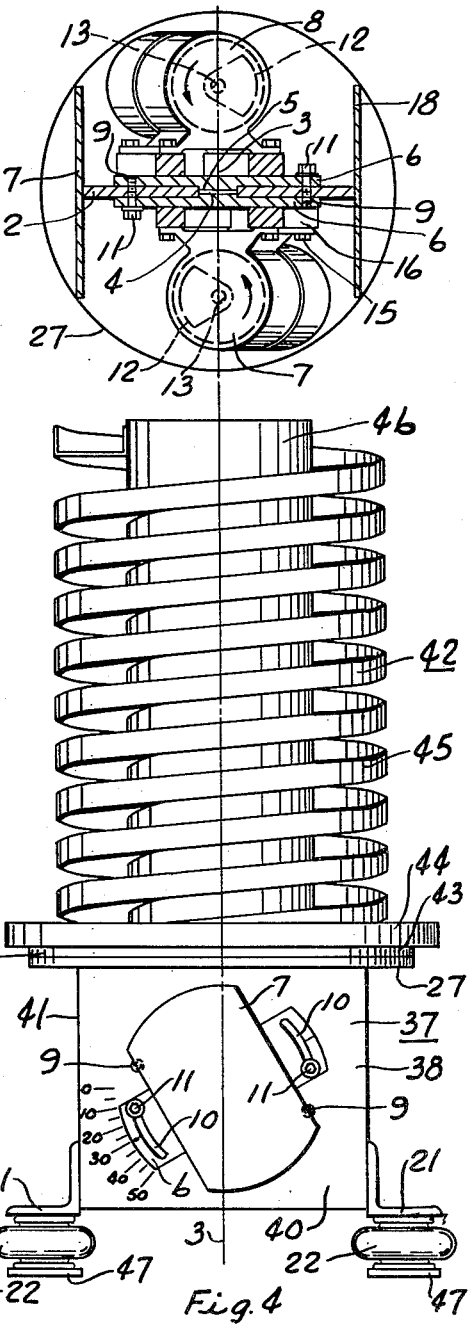
INVENTOR.
WILLIAM V. SPURLIN
HIS ATTORNEY

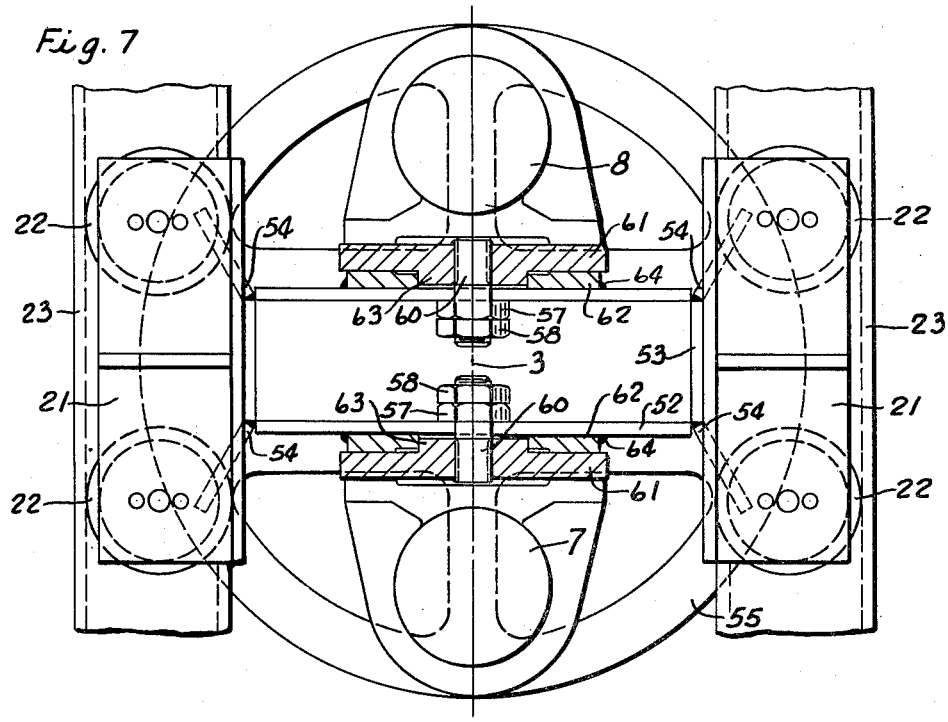
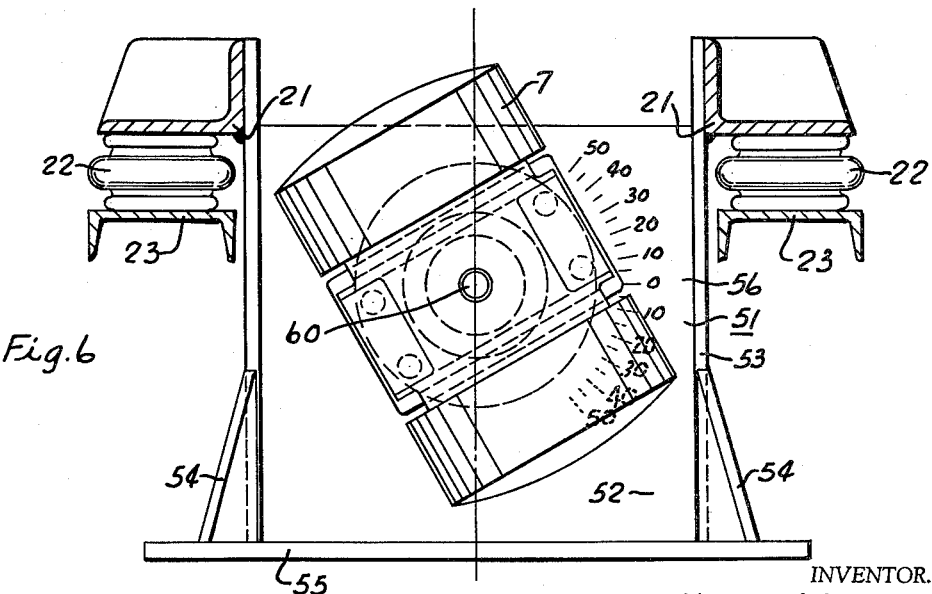

Sept. 11, 1962  W. V. SPURLIN  3,053,380
DUAL ECCENTRIC WEIGHT VIBRATORY GENERATOR FOR CIRCULAR FEEDER
Filed Feb. 15, 1960  4 Sheets-Sheet 4
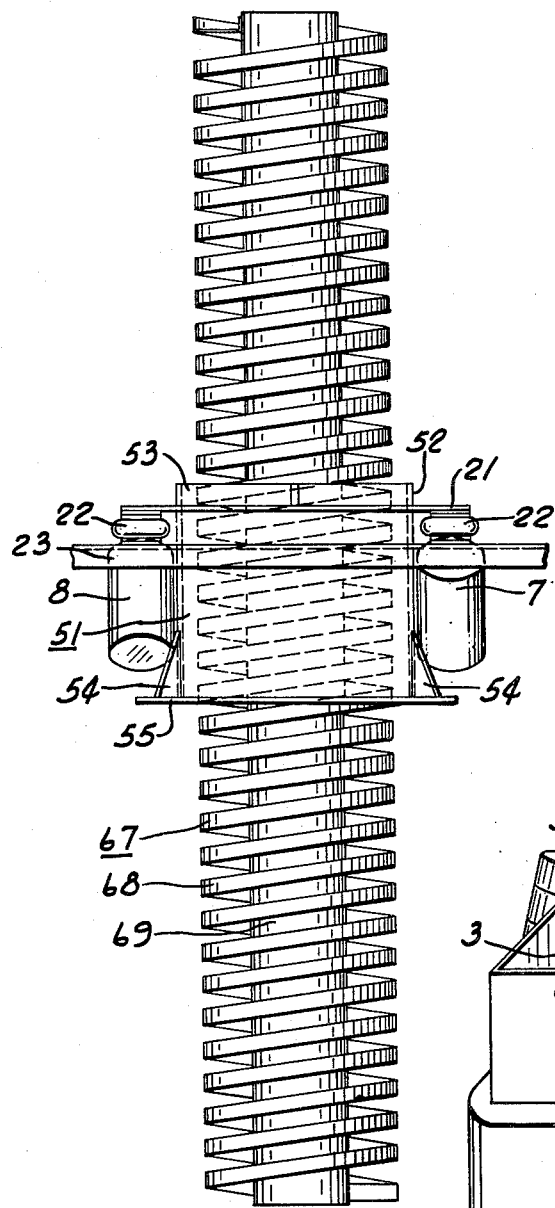
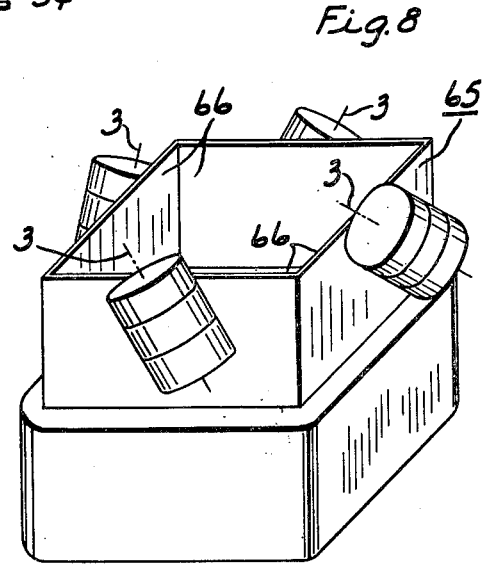
INVENTOR.
WILLIAM V. SPURLIN
BY
HIS ATTORNEY

United States Patent Office 3,053,380
Patented Sept. 11, 1962

3,053,380
DUAL ECCENTRIC WEIGHT VIBRATORY GENERATOR FOR CIRCULAR FEEDER
William V. Spurlin, Indiana, Pa., assignor to Syntron Company, Homer City, Pa., a corporation of Delaware
Filed Feb. 15, 1960, Ser. No. 8,691
8 Claims. (Cl. 198—220)

This invention relates generally to vibratory generators and more particularly to a vibratory generator for producing oscillations in an arcuate path about a central axis.

The principal object of this invention is the provision of a vibratory generator mounted on isolators and having a plurality of rotary vibrators disposed about a substantially vertical central operating axis. These rotary vibrators may be independently driven rotary shafts each having an eccentric weight at one or both of its ends and without having any mechanical interconnection therebetween. These shafts may be driven by independent motors but they are preferably motor shafts themselves with eccentric weights at both ends. It is preferable to use these rotary vibrators in pairs or multiple pairs of eccentrically weighted motors disposed about a vertical central axis with their motor axes adjustably mounted to support them vertically and parallel to the vertical axis or at an angle on each side of the vertical axis to produce opposite directions of feed about their vertical axis. To effect this feeding action it is necessary to rotate these pairs of motors in the same direction and at a phase relation that causes the forces of the eccentric weights to oppose or cancel each when in line with each other and with a line passing through their rotary axes when vertical. Thus at two points 180° apart of their rotating cycle their forces are effective in cancelling each other and the two intermediate points of their cycle at 90° they are not in alignment and they produce their maximum force which is directed outwardly 180° from each other but spaced from the vertical central operating axis between the motor axes which provides a rotary swinging torque about the vertical central operating axis. If both motors are rotating counter clockwise when viewed from above and the first force impulse is effective in a rotary counter clockwise pulsation, then the next pulsation that occurs after motors rotate one half turn, the force impulse is counter clockwise. This will provide equal and opposite arcuate vibration of movement with no feeding action. To produce a feeding action the axis of one and preferably all the motors should be inclined at an angle, all in the same direction, relative to the vertical central operating axis. If a material handling device directly attached to the motors includes a horizontal plate and the angle of disposition of the counter clockwise rotating motor axes relative to the vertical central operating axis places weight at the top of the motors to the left and the weights at the bottom of the motors to the right of the vertical central operating axis the feeding action on the plate will be counter clockwise. If these motor axes are tilted in the opposite direction the feed will be clockwise. If the material handling device is a helix in place of a flat horizontal plate, the material will be fed upwardly or downwardly on the helix depending upon the angle of inclination of the rotary axis of the motors. Thus the angle of the rotary axis of each of the motors is similar in comparison to the angle of inclination of guiding spring members in a vibratory swing system of this character.

The direction of rotation of the motors has no effect in the direction of the feeding of the material, only the angle of inclination of the rotary axis of the motors relative to the vertical central operating axis determines the direction of feed regardless of the hand of the helix along which the material is fed. The motors must be operated in the same direction of rotation and each motor pair must be operated so that the eccentric weights are 180° out of phase with each other and when once started they will remain in synchronism.

If three motors are positioned at 120° apart or symmetrically about the vertical central operating axis they may be made to function and thus stay in 120° phase relation with each other. The use of an odd number of motors around a central axis such as three and five aids in increasing the vibratory forces for a given size of material handling device.

As previously stated if the axis of the plurality of motors making up the vibratory generator are all adjusted to their vertical position and rotated in the same direction and when in pairs operate at 180° out of phase with each other without mechanical interconnection there will be no feeding action on a horizontal plate. If each of the motors are then adjusted in the same direction, that is, with the upper end of the shafts moving to the left of the vertical central axis, then the feeding will be counter clockwise, there being no feed at the position when the axes of the motors are vertical and a normal feed when the axes of the motors approach 45° which would represent the intermediate stage where both the horizontal and vertical components are equal after which time the vertical component would increase to its maximum as when the axes of the motors were horizontal.

Another important object of this invention is the provision of a plurality of rotary vibrators mounted symmetrically around a central axis and having rotary shafts on which are mounted eccentric weights and wherein there is no mechanical interconnection whatsoever between the rotary shafts of the plural rotary vibrators, yet they rotate in the same direction and operate in synchronization 180° out of phase with each other to produce uniform reciprocating forces arcuately about the vertical central operating axis of the material handling device.

Another object is the provision of a vibrating generator having a stiff frame upon which are adjustably mounted a plurality of rotary vibrators disposed about a vertical central axis on a rigid frame and wherein one end of the frame carries isolators to support the vibrating generator and the other side of the frame supports the object to be vibrated.

Another object is the provision of a vibrating generator having a stiff or rigid frame and upon which are adjustably mounted a plurality of rotary vibrators disposed about a vertical central axis on a rigid frame that carries isolators outwardly beyond the rotary motors and supports the material handling device inwardly of the circular arrangement of these rotary motors.

Other objects and advantages of this invention appear hereinafter in the following description and claims.

The accompanying drawings show for the purpose of exemplification without limiting this invention or the claims thereto, certain practical embodiments illustrating the principles of this invention; wherein FIG. 1 is a view in side elevation of a rotary vibratory generator suspended from one end by isolators and having its opposite end carrying an object to be vibrated.

FIG. 2 is a view in side elevation of a vibratory generator similar to that shown in FIG. 1 having a different type of member to be vibrated.

FIG. 3 is a view taken on the line 3—3 of FIG. 1 of the vibratory generator.

FIG. 4 is a view in elevation showing the vibratory generator supporting the object to be vibrated.

FIG. 5 is a view in side elevation showing the same type of vibratory generator illustrated in FIG. 4 but a different character of object to be vibrated.

FIG. 6 is a view in side elevation partly in section of a vibratory generator.

FIG. 7 is a view partly in section illustrating the vibratory generator in FIG. 6.

FIG. 8 is a view in perspective showing a vibrating generator having more than two rotary vibrators.

FIG. 9 is a view in side elevation of a vibratory generator secured to an object to be vibrated which is a long helical conveyor.

Referring to FIGS. 1 to 3 of the drawings the vibratory generator unit indicated at 1 consists of a heavy frame made up of a transverse plate 2 centered relative to the central axis 3 which in this instance is vertical. This heavy plate is provided with an opening 4 in the center in the form of a round hole for receiving the circular projection 5 which forms the swivel on the pad member 6 of each of the vibratory generators 7 and 8. The pad 6 is provided with a slot 10 at opposite ends for receiving the clamping bolts 11 that extend into and are threadably secured to the plate 2 in the threaded holes 9.

Vibratory generators 7 and 8 are electric motors having eccentric weights on either or each end of a centrally disposed shaft that carries the armature of the motor. These weights are indicated at 12 in FIG. 3 and are mounted on both ends of the rotary shaft 13. These electric motors are preferably alternating current but may be direct current motors with the speed control and represents the means to rotate the vibrating weights. The alternating current motors are chosen for a definite speed characteristic and ordinarily the vibratory generators 7 and 8 are matched in speed characteristics. They do not have to be accurately matched but if a 1800 r.p.m. motor is chosen for one, the same r.p.m. motor is chosen for the mate of its pair and when operated they will work with each other and produce a synchronism although there is no attempt to mechanically synchronize the rotation of their eccentric weights. They do this inherently and create a reciprocal arcuate force about the central axis 3. As shown in FIG. 1 these rotary vibrators may be adjusted from a position where their axes 13 are vertical or at an angle of 50° or more. As illustrated in dotted lines the clamping bolts are changed in position to permit the pads 6 to be adjusted from zero to minus 50° or below the horizontal as illustrated in dotted lines by using the other set of threaded holes 9. When the rotary vibrators 7 and 8 are disposed as shown in FIGS. 1 to 3 and are rotated counter clockwise as illustrated by the arrows in FIG. 3, they will create a vibratory force at an angle relative to the conveyor track 14 shown in FIG. 1 to feed the materials upwardly. If the track remains the same and the rotary vibrators are vibrated in the same direction and moved to the position shown in dotted lines in FIG. 1, then the forces created will flow the material downwardly along the conveyor track 14 or in the opposite direction.

The rotary vibrators 7 and 8 are independently mounted to the pads 6 by means of the bolts 15 and different size spacers 16 may be provided to vary the distance between the center of the rotary axis 13 of each rotary vibrator and the central axis 3.

The balance of the generator frame consists of the end plates 17 and 18 which are secured to the ends of the heavy plate 2, which end plates are in the form of a trapezoid as shown in FIG. 2. Each of these three plates are joined to the base member 20 which in this instance is formed by four bracket members 21 one in each quadrangle for the purpose of receiving the mountings of the isolators 22 which in turn are secured to the support members 23. These isolators are preferably in the form of pneumatic chambers, the stiffness of which can be varied by changing the air pressure therein. The ends of the support members 23 are rested on the pillow supports 24 as shown in FIG. 1 and are carried on the member 25 which has a central chamber 26.

The other end of the vibrating generator frame 1 is provided with mounting means or mounting plate 27 to which is secured by bolting or other suitable means the base 28 of the material handling mechanism 30 in the form of a conveyor with the track 14 having a fence 31 and which is secured to a central tube 32. The plate 28 is braced and secured to the tube 32 by the additional means of the bracket members 33. The bottom of the tube 32 is provided with an enlarged pan 34 for receiving materials from the chute 35 which materials are fed across the pan 34 and upwardly along the inclined track 14. If two leads to the conveyor track are provided, the pan 34 becomes a transfer pan such as illustrated in United States Patent 2,760,504.

In the structure shown in FIG. 2, the vibratory generator is the same but the material handling device 36 is different and comprises a cylindrical drum which is detachably secured to the plate 27 by means of its attaching plate 28.

Referring to FIGS. 4 and 5, the vibratory generator 37 is similar to the generator unit shown in FIGS. 1 to 3 with the exception that the frame 38 is made up of two wide plates 40 and two narrow plate 41 secured together in box style and to the plate 27 which in turn supports the material handling device 42 which has a mounting plate 43 and a large feeding plate 44 that feeds to the inclined arcuate track 45 mounted on the central tube 46. The angle bracket members 21 in the vibratory generator 37 are mounted directly to the plates forming the frame 38 and thereby support the object to be vibrated from the floor through the isolators 22 from the mounting pads 47 that preferably connect to the isolator plates in the same manner as the brackets 21 as shown in FIG. 5. The generator shown in FIGS. 4 and 5 is the same; however, the objects being vibrated are different. It will be shown in FIG. 5 that the rotary vibrators 7 and 8 are spaced greater from each other than that shown in FIGS. 1 to 3 owing to the width of the end plates 41 of the frame 38. This places the axial center of the rotary vibrators further from the center 3 of the generator. In the structure of FIGS. 1 to 3 the rotary center of the rotary vibrators is within the radius of gyration of the device. However, in the structure of FIGS. 4 and 5 the rotary centers of the rotary vibrators are beyond the radius of gyration of the structure. Whereas, in the structure of FIGS. 6 and 7 the rotary centers of the rotary vibrators are on the radius of gyration. The conveyor 42 as shown in FIG. 5 is extended considerably higher than that shown in FIG. 4 and to aid in the suspension of the weight, a loop or hook member 47 is provided at the top of the cylinder 46 and is hooked onto the helical spring 48 which in turn is suspended from the eye 49 secured to a beam or ceiling indicated at 50. Here some of the weight of suspension is supported by the spring 48 which keeps the top of the cylinder from swaying laterally as well as retains some of the weight. The spring 48 is in fact an isolator member.

Referring to the structure shown in FIGS. 6 and 7, the vibratory generator unit 51 is made up of the four plates 52 and 53, the plates 52 being somewhat larger than the plates 53 and formed in box shape as similar to that of the generator 37. The plates 52 and 53 form a frame which is braced by the angle members 54, all of which are in turn secured to the mounting plate 55 to which the material handling device is secured. The plate 55 is similar to the plate 27 as shown in FIGS. 1 to 5.

The box members of the vibratory generator unit 51 forms a frame 56 which is open at the top to provide access to the interior of the frame 56 for the purpose of loosening and unloosening the nut 57 and the lock nut 58 which are threadably received on the stem 60 formed integral with the base 61 of the rotary vibrator 7. An annular pad 62 is washer-shaped having a bore to receive the annular extension 63 which forms the swivel on the base or pad 61. The pad 62 is preferably secured to the plate 52 of the frame 56 by welding as indicated at 64. Thus both the rotary generators 7 and 8 may be adjusted through a hundred degrees by merely loosening the nuts and swinging the rotary generator about the axis of the stem 60. As shown in FIG. 7 both rotary vibrators 7 and 8 have their rotary axes vertical.

The frame 56 is provided with the angle brackets 21 for supporting the vibratory generator 51 on the isolators 22 which in turn are mounted on the freely spaced channel members 23.

The structure shown in FIG. 8 is similar to the structures of FIGS. 6 and 7 with the exception that the frame 65 is made of four plates 66 of equal size and a rotary generator is mounted on each plate there being four in number. Any number of rotary generators may be employed and will operate in synchronism about a vertical central axis. These rotary vibrators are on the radius of gyration of the device.

Referring to FIG. 9, the vibratory generator illustrated is similar to that shown in FIGS. 6 and 7 is placed intermediate the ends of a material handling device such as the helical conveyor 67 made up of the flights or track 68 secured to the central tube 69 and is attached to the plates 52, 53 and 55, which form the base or box of the vibratory generator unit 51. This generator base is attached to the transverse angle brackets 21 which in turn are attached to the isolators 22 arranged in quadrangular relation. The opposite ends of the isolators are secured to the transverse channel support members 23 which in turn are mounted on a suitable frame, cage or foundation to support the conveyor. If this conveyor extends between floors of a building then the base may be mounted on an intermediate floor.

The mass and shape of any article or of material has a definite effect in their conveyability. This is particularly true when the articles or material are conveyed by vibratory motion in a swing conveying system whether the conveying is in a straight, arcuate or circular path. Articles or material that are conveyed when submerged in a liquid also affects their conveyability. To enable one to obtain a maximum feed rate or a specific feed rate of articles or material under different conditions it is preferable to vary the feed angle. This is difficult in some vibratory motors but in each of the rotary swing motors comprising this invention the angle of the motor axis is readily changed to vary the feed angle. Thus by changing the angular position or inclination of these motors to vary their feed angle the rate of feed of all parts and materials may be varied from a minimum rate of feed to a maximum rate of feed.

Since the slope of the track is fixed and if the isolators are not varied in resiliency then the only variable is the angular inclination or position of the rotary vibratory motor.

By changing the angle of inclination of the rotary central axis one may apply different forms of vibration to the materials within the drum, circular or helical conveyor.

When the rotary vibrators are adjusted at different angles relative to the central axis, they affect the operation of the materials handling device to which they are attached in different ways in accordance to the type of material handling device to which the generator is secured. In the case of elevating or descending helical conveyors such as illustrated in FIGS. 1 to 5, a change in the flow characteristics may be effected by changing the degree of the angle of the rotary axis 13 to that of the central axis 3 which will create different flow characteristics. This taken in combination with the high amplitude attainable by rotary vibrators of this character will produce a materially improved flow characteristic for different purposes than the handling of materials which is far more advantageous than any other type of vibratory generating device for vibratory conveyors.

By adjusting the axes of the motor shaft in the opposite direction of that shown the material is caused to be fed in the opposite direction and minute adjustments of the annular positions of the motor likewise improve the conveying characteristics of the particular material or articles handled.

I claim:

1. A vibratory generator unit for attachment to a member to be vibrated consisting of a stiff frame having a vertical central axis, isolator means secured to said frame to support said generator unit, mounting means on said frame to removably secure said vibratory generator unit directly to the member to be vibrated, a plurality of rotary vibrators each having an eccentric weight mounted to revolve on a rotary axis, a pad for mounting each rotary vibrator on different sides of said frame, means to rotate each vibrator independently relative to each other vibrator and effect through said frame an inner reaction between said vibrators to produce cooperative reciprocating drive impulses, swivel means on each pad to adjust the relative angular position of the rotary axis of each vibrator about an independent horizontal axis, the horizontal axis of each swivel means lying in a horizontal plane normal to said vertical central axis, said swivel means on each pad disposing the rotary axis of its rotary vibrator in different angular positions in a spaced plane parallel to said vertical central axis to change the direction of the application of said cooperative reciprocating drive impulses to the member to be vibrated.

2. The vibratory generator unit of claim 1 characterized in that said member to be vibrated is a helical conveyor having vertical central axis coincident with said vertical central axis of said frame, and said swivel on each pad is selectively secured to dispose said rotary vibrators to deliver a reciprocating drive impulse to convey material in either direction on said helical conveyor.

3. The vibratory generator unit of claim 1 characterized in that said frame includes a vertical plate means having a plurality of faces and with its vertical central axis coaxially concentric with said vertical central axis of said frame, a rotary vibrator with its pad secured to each face of said plate means.

4. The vibratory generator unit of claim 3 characterized in that said vertical plate means is in the form of a square box having four faces.

5. The vibratory generator unit of claim 1 characterized in that said frame includes a vertical plate means having a plurality of faces, a bracket means, a rotary vibrator with its pad for each face, bracket means at one end of said plate means to secure said isolator means to said frame, and the opposite end of said plate means having thereon said means to secure said vibratory generator unit directly to the member to be vibrated.

6. The vibratory generator unit of claim 1 characterized in that said rotary vibrators are maintained relative to said vertical central axis so as to dispose their rotary axes on the radius of gyration of the vibratory generator unit.

7. The vibratory generator unit of claim 1 characterized in that said rotary vibrators are maintained relative to said vertical central axis so as to dispose their rotary axes wtihin the radius of gyration of the vibratory generator unit.

8. The vibratory generator unit of claim 1 characterized in that said rotary vibrators are maintained relative to said vertical central axis so as to dispose their rotary axes beyond the radius of gyration of the vibratory generator unit.

References Cited in the file of this patent

UNITED STATES PATENTS

| | | |
|---|---|---|
| 2,630,209 | Carrier | Mar. 3, 1953 |
| 2,827,157 | Tsuchiya et al. | Mar. 18, 1958 |
| 2,967,434 | Mahlfeldt | Jan. 10, 1961 |

FOREIGN PATENTS

| | | |
|---|---|---|
| 206,666 | Australia | Feb. 14, 1957 |
| 1,154,959 | France | Apr. 18, 1958 |
| 811,273 | Great Britain | Apr. 2, 1959 |